United States Patent
Reingruber et al.

(10) Patent No.: US 10,770,708 B2
(45) Date of Patent: Sep. 8, 2020

(54) BUSBAR AND BATTERY MODULE HAVING SUCH A BUSBAR

(71) Applicant: Nordfels GmbH, Bad Leonfelden (AT)

(72) Inventors: Martin Reingruber, Vorderweißenbach (AT); Edmund Jenner-Braunschmied, Zwettl an der Rodl (AT)

(73) Assignee: VOLTLABOR GmbH, Bad Leonfelden (AT)

( * ) Notice: Subject to any disclaimer, the term of this patent is extended or adjusted under 35 U.S.C. 154(b) by 191 days.

(21) Appl. No.: 15/779,014

(22) PCT Filed: Aug. 31, 2016

(86) PCT No.: PCT/EP2016/070557
§ 371 (c)(1),
(2) Date: Jul. 4, 2018

(87) PCT Pub. No.: WO2017/088996
PCT Pub. Date: Jun. 1, 2017

(65) Prior Publication Data
US 2018/0351152 A1 Dec. 6, 2018

(30) Foreign Application Priority Data
Nov. 24, 2015 (EP) .................... 15196147

(51) Int. Cl.
*H01M 2/00* (2006.01)
*H01M 2/20* (2006.01)
(Continued)

(52) U.S. Cl.
CPC ............. *H01M 2/206* (2013.01); *H01H 85/00* (2013.01); *H01M 2/34* (2013.01); *H01M 2/348* (2013.01);
(Continued)

(58) Field of Classification Search
CPC ..... B60L 50/64; H01M 2220/20; H01M 2/34; H01M 2200/103; H01H 2085/025;
(Continued)

(56) References Cited

U.S. PATENT DOCUMENTS

2015/0050531 A1   2/2015 Felser et al.
2017/0194616 A1 * 7/2017 Yang ................... H01M 2/1072

FOREIGN PATENT DOCUMENTS

DE   102011007319 A1   10/2012
DE   102012205021 A1   10/2013
(Continued)

*Primary Examiner* — Cynthia H Kelly
*Assistant Examiner* — Monique M Wills

(57) ABSTRACT

A battery, a battery pack for the battery, and a busbar for connecting battery cells, the busbar having an electrically conductive metal sheet and having at least one sheet metal connector piece, which is incorporated into the metal sheet with the aid of a cutting method and which protrudes from the metal sheet; the sheet metal connector piece has a contacting part for electrically connecting to a pole of the battery cell and a safety part embodied in the form of a fuse. In order to create a busbar that is durable and simply designed and nevertheless has a high degree of fire safety, it is proposed that the safety part be embodied in the form of a coiled helical spring.

13 Claims, 3 Drawing Sheets

(51) Int. Cl.
    *H01R 13/24*     (2006.01)
    *H01R 13/68*     (2011.01)
    *H01R 31/08*     (2006.01)
    *H01M 2/34*     (2006.01)
    *H01H 85/00*     (2006.01)
    *B60L 50/64*     (2019.01)
    *H01H 85/02*     (2006.01)

(52) U.S. Cl.
    CPC ......... *H01R 13/2421* (2013.01); *H01R 13/68* (2013.01); *H01R 31/08* (2013.01); *B60L 50/64* (2019.02); *H01H 2085/025* (2013.01); *H01M 2200/103* (2013.01); *H01M 2220/20* (2013.01); *Y02T 10/705* (2013.01)

(58) Field of Classification Search
    CPC ........ H01H 85/00; H01R 13/68; H01R 31/08; H01R 13/2421
    See application file for complete search history.

(56) References Cited

FOREIGN PATENT DOCUMENTS

| | | | |
|---|---|---|---|
| EP | 2337115 | A2 | 6/2011 |
| EP | 2608243 | A1 | 6/2013 |
| EP | 2711493 | A2 | 3/2014 |

* cited by examiner

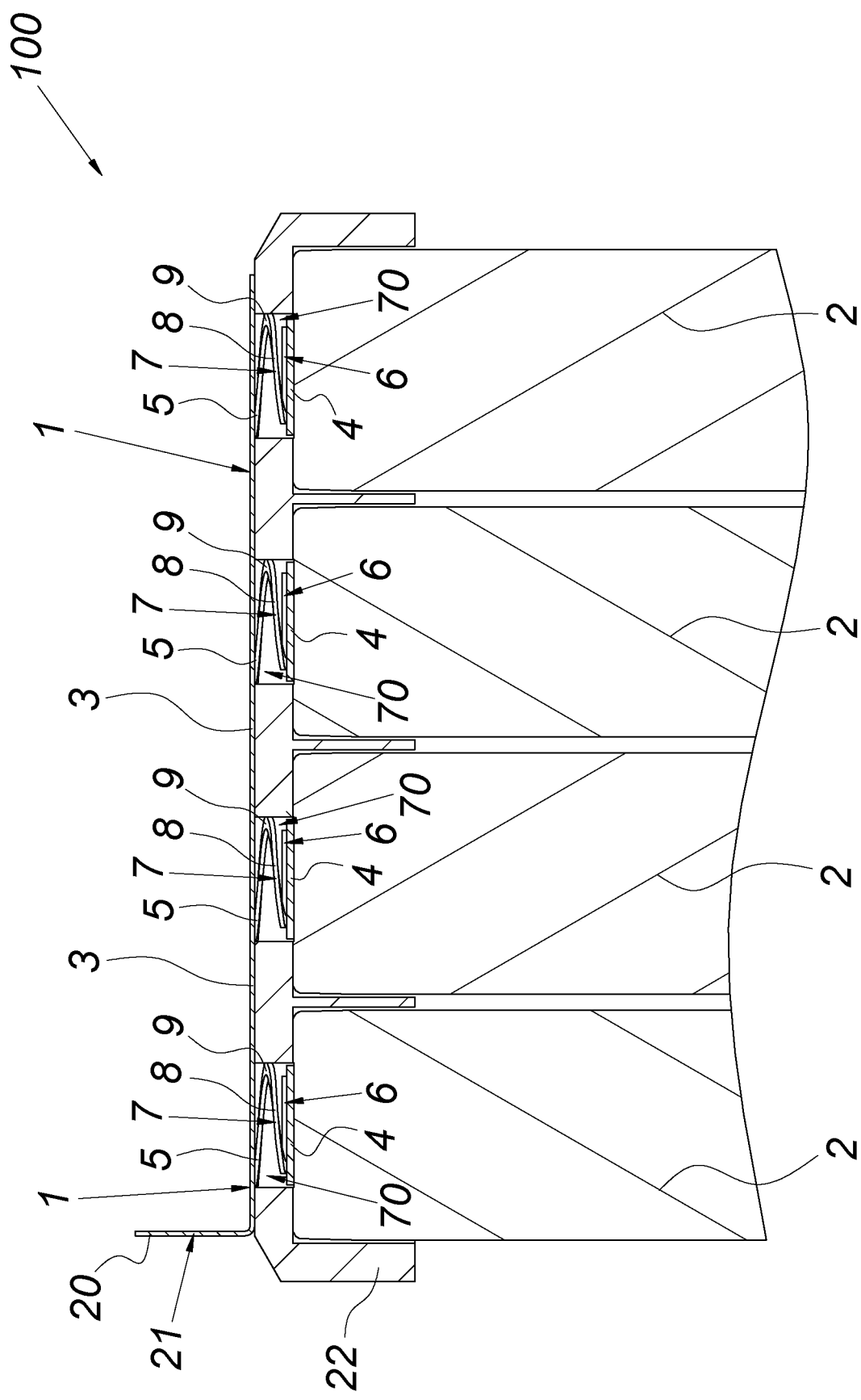

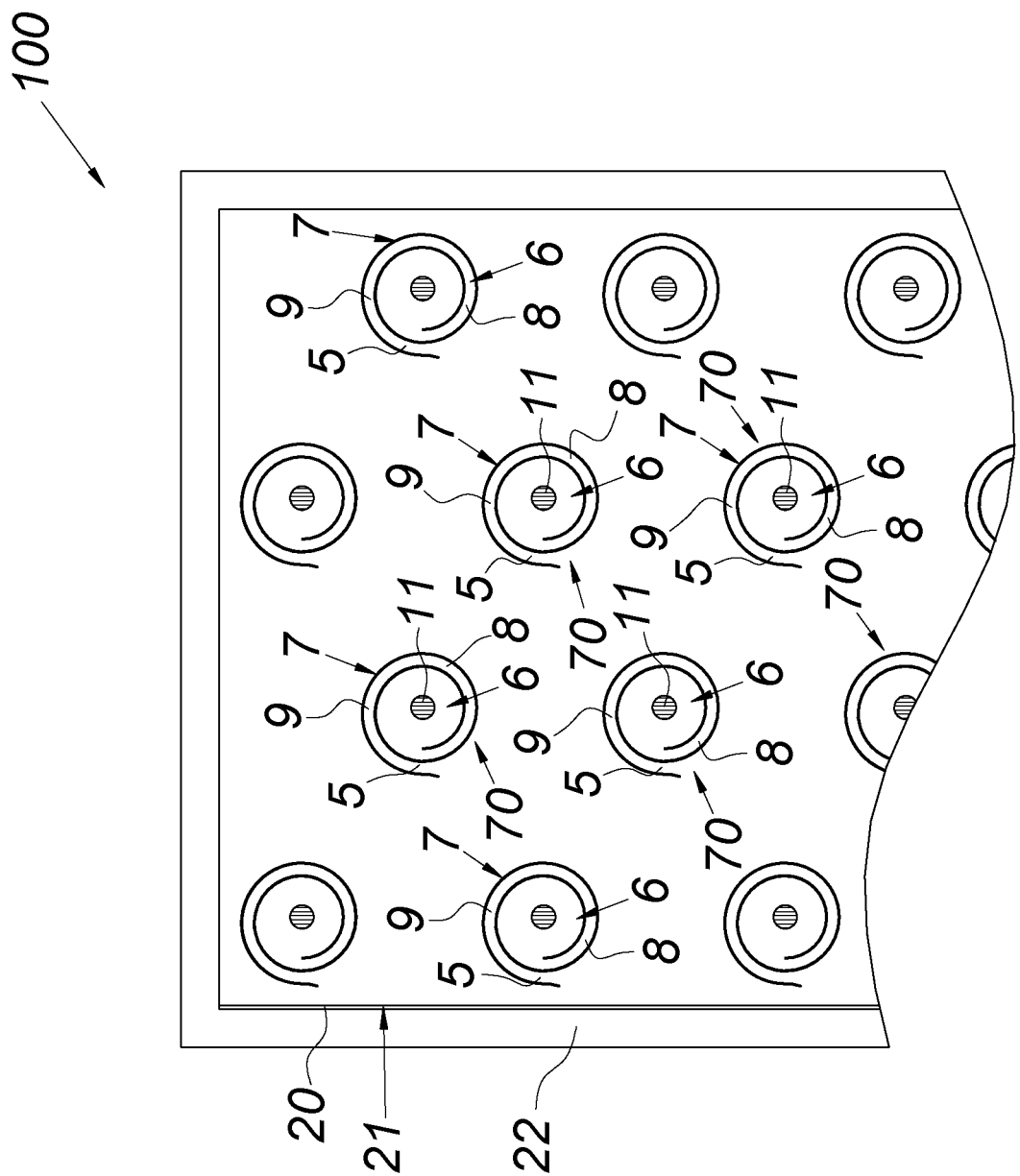

BUSBAR AND BATTERY MODULE HAVING SUCH A BUSBAR

FIELD OF THE INVENTION

The invention relates to a battery, a battery pack for the battery, and a busbar for connecting battery cells, having an electrically conductive metal sheet and having at least one sheet metal connector piece, which is incorporated into the metal sheet with the aid of a cutting method and which protrudes from the metal sheet; the sheet metal connector piece has a contacting part for electrically connecting to a pole of the battery cell and a safety part embodied in the form of a fuse.

BACKGROUND OF THE INVENTION

Busbars for electrically connecting battery cells to one another in parallel or serial fashion are known from the prior art. Busbars of this kind use an electrically conductive metal sheet and sheet metal connector pieces protruding from it, which are electrically connected to the battery cells. To this end, the sheet metal connector pieces each have a contacting part that is welded to a pole of a battery cell. The sheet metal connector pieces are incorporated into the metal sheet with the aid of a cutting method such as incision—which can be carried out by means of stamping or laser cutting.

It is also known (EP2337115A2) to provide such sheet metal connector pieces with a safety part that embodies an electrical fuse on the sheet metal connector piece and protects the connected battery cell from a safety-critical amperage. This fuse is implemented in the form of a constriction of the cross-section of the sheet metal connector piece. Such a constriction resistance, however, has the disadvantage of decreasing the mechanical strength of the sheet metal connector piece, which increases the risk of a mechanical line break in the event of physical shocks or vibrations. A reduced durability of the busbar, particularly when used in mobile applications, must be expected.

In order to counteract this disadvantage, for example EP2608243A1 proposes coating the sheet metal connector piece with a resin in the safety part. But this is not only complex in design, it can also disadvantageously increase the fire hazard, particularly when this fuse is activated.

SUMMARY OF THE INVENTION

Based on the prior art explained at the beginning, therefore, the stated object of the invention is to create a busbar, which is rugged, simply designed, and nevertheless has a high level of fire safety.

The invention attains the stated object in that the safety part is embodied in the form of a coiled helical spring.

If the safety part is embodied in the form of a coiled helical spring, then among other things, it is possible to reduce the rigidity in the safety part—it is also possible, through the increased multidimensional mobility of the sheet metal connector piece that this ensures, to absorb physical shocks and vibrations in a particularly simple and safe way. This can reduce the risk of mechanical line breaks and thus increase the durability of the busbar in comparison to the prior art. In addition, this shape of the safety part can be produced in a relatively simply designed way—for example in that this safety part is wound from the sheet metal part of the metal sheet that is produced in the metal sheet by incision (shear cutting/laser cutting). The busbar according to the invention and the sheet metal connector piece can thus be composed of a single piece, making it possible, for example, to achieve a busbar that is inexpensive to produce. In addition, because the safety part is embodied in the form of a coiled helical spring, the invention does not require any additional steps or aids to increase the mechanical resilience—thus as a further consequence making it possible to avoid having to take oscillation-damping steps in the vicinity of the safety part that may increase the risk of fire. The busbar according to the invention can therefore also ensure a particularly high degree of fire safety. In addition, because the safety part is embodied in the form of a coiled helical spring, it is possible to durably cushion and dissipate a stress acting axially on the battery cells, thus making it possible to achieve a robust, durable busbar.

The invention can turn out to be particularly advantageous if the safety part is embodied in the form of a helical spring. A helical spring produced by an axial stretching can exhibit an improved spring behavior. For example, the axial stretching can be carried out simultaneously with an electrical contacting or integral joining of the contacting part of the sheet metal connector piece to the pole of the battery cell.

The structural embodiment in the region of the safety part can be further simplified if the safety part is coiled in a square or spiral shape. In this connection, in comparison to a square coiled shape, a spiral coiled shape particularly avoids any singularities in the corner region of the sheet metal connector piece—and in this way, can be beneficial to the functionality of the fuse.

If the safety part is coiled around the contacting part, then the safety part embodied in the form of a coiled helical spring can be embodied in a simply designed way since, for example, this allows the safety part to be positioned around the contacting part in a simple concentric arrangement. This also makes it possible to avoid tight bending radii in the safety part and thus enables achievement of a busbar that is more durable on the whole.

If the coil diameter of the safety part decreases in the direction of the contacting part starting from the metal sheet, then this allows the specific resistance of the safety part to be elegantly set by means of the line length—or connector piece length. The use of a constriction resistance that functions as a predetermined breaking point can be omitted so that it is not necessary to fear a reduced durability of the busbar—as in the prior art.

If the safety part is also embodied in the form of a helical tension/compression spring, then it is possible to ensure an axial cushioning in both directions, thus making it possible to further increase the mechanical resilience and durability of the busbar.

Preferably, the safety part can be embodied in the form of a sheet metal strip in order to thus provide—in a simply designed way—a sufficient conductor path width for carrying a current. In addition, this can on the one hand, enable achievement of a high mechanical stability and on the other, permit a particularly fast-reacting fuse to be achieved in a simply designed way.

If at one of its ends, the safety part adjoins the metal sheet and at its other end, it adjoins the contacting part, then this can result in a compact embodiment of the sheet metal connector piece. It is thus possible to further simplify the structural embodiment of the busbar.

In an easy-to-manufacture way, the metal sheet can have a nickel material. A nickel material can also feature an improved capacity for being welded to a pole of the battery cell.

Preferably, all of the sheet metal connector pieces of the metal sheet are uniformly embodied for connection to the respective battery cell so that a fuse is available between the metal sheet and the pole.

The safety part be embodied in the form of a short-circuit fuse in order not only to protect the battery cell from a safety-critical amperage, but also to electrically disconnect it from the other battery cells in the event of a thermal failure.

A short-circuit fuse can limit the repercussions of both an internal short-circuit and an external short-circuit of the battery cell connected to the busbar. An internal short-circuit of the battery cell can occur, for example, due to a mechanical overloading of the battery cell. The busbar according to the invention durably prevents the occurrence of a short-circuit current through the damaged battery cell, thus preventing the failure of other battery cells that are electrically connected to the busbar in parallel fashion. The short-circuit fuse according to the invention also protects an intact battery cell from being damaged if an internal short circuit occurs in another battery cell that is electrically connected to it in parallel via the busbar. It is therefore possible to produce a busbar that can durably protect battery cells from internal and external short-circuits in the busbar. This can be particularly advantageous in battery modules in which several battery cells are electrically connected to one another in parallel via a busbar.

In addition, by contrast with the prior art, by embodying the fuse as a short-circuit fuse, the electrical resistance between the busbar and battery cell can be kept to a minimum, which not only advantageously minimizes the total resistance in the main current path, but also can ensure an advantageous voltage compensation between the parallel battery cells during discharging and charging.

The busbar according to the invention can be particularly suitable for use in a battery module with a plurality of battery cells in which each of the busbar's sheet metal connector pieces is connected to a respective pole of a battery cell.

The cutting method used on the metal sheet can be facilitated if the battery cells positioned next to one another are electrically connected in parallel via the busbar—since this can achieve, among other things, increased dimensions of the metal sheet.

A particularly durable contacting between the busbar and the pole of the battery cell can be enabled if the contacting part of the sheet metal connector piece is integrally connected to the pole of the battery cell. For example, this integral connection can be produced by means of a welding method, in particular a spot welding or laser welding.

A battery can be advantageously composed of a plurality of battery modules according to the invention which are electrically connected to one another.

BRIEF DESCRIPTION OF THE DRAWINGS

The subject of the invention will be described in greater detail based on an exemplary embodiment shown in the figures. In the drawings:

FIG. 1 shows a cross-sectional view through a battery module,

FIG. 3 shows a top view of the busbar of a battery module.

DETAILED DESCRIPTION OF THE PREFERRED EMBODIMENTS

Figure 2B:
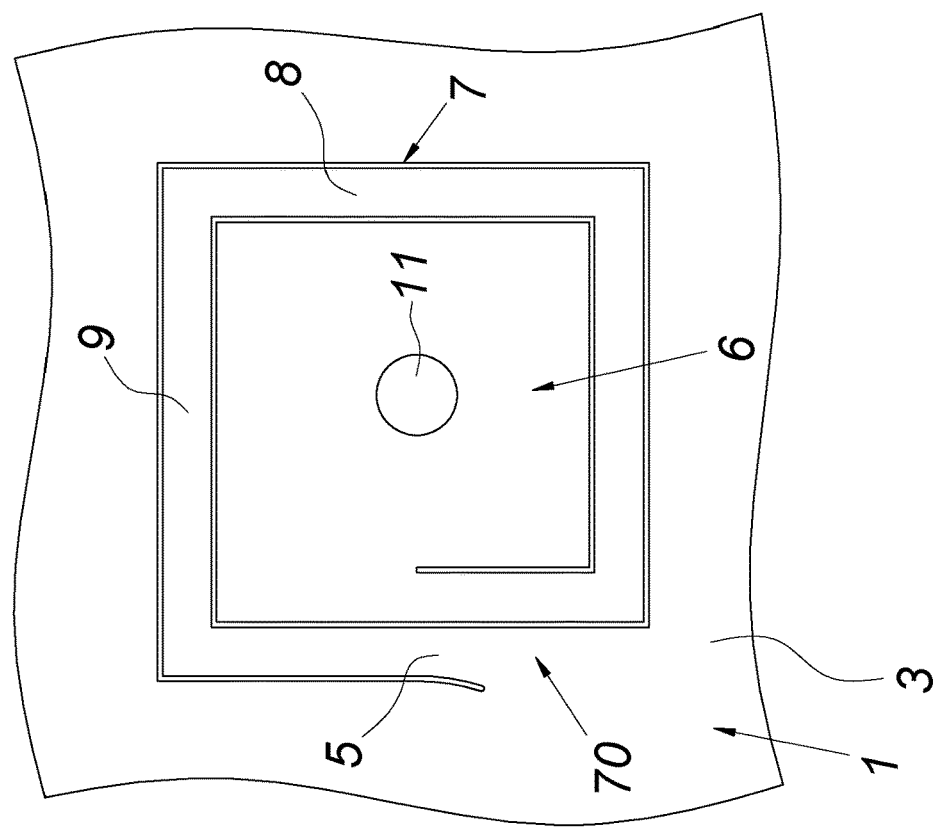
FIGS. 2a & b are detailed views of different busbars according to the invention.

For example, FIG. 1 shows a busbar 1 according to the invention for connecting battery cells 2. The busbar 1 here is embodied in the form of a metal sheet 3, namely a nickel sheet, in order to produce an electrically conductive connection between the poles 4 of the battery cells 2. For this purpose, the metal sheet 3 has a protruding sheet metal connector piece 5, which has been partially cut out from the metal sheet 3 for this purpose by means of a cutting method (such as stamping)—in other words, this sheet metal connector piece 5 protrudes out from the sheet plane of the metal sheet 3. The sheet metal connector piece 5 has a contacting part 6, which produces the electrical connection between the busbar 1 and the respective pole 4 of the battery cells 2. In addition, the sheet metal connector piece 5 has a safety part 7, which is embodied in the form of a fuse 8—and disconnects the electrical connection between the busbar 1 and the respective pole 4 of the battery cells 2, for example if an overcurrent or overheating occurs. The safety part 7 in this case is embodied in the form of a coiled helical spring 70, from its beginning at the metal sheet 3 to its end at the pole 4. It is thus possible to achieve a relatively mobile sheet metal connector piece, which can also durably protect the busbar 1 from mechanical breakage. The busbar 1 according to the invention is therefore particularly well-suited to a mobile use. In addition, because the safety part 7 is embodied in the form of a coiled helical spring 70, a comparatively long line length on the sheet metal connector piece 5 is produced, which property enables a particularly advantageous adjustment of the electrical resistance and thus the parameters of the fuse; it is therefore possible to eliminate the provision of a constriction resistance, unlike in the prior art. As a result, it is not necessary to provide the safety part 7 with a constriction resistance that serves as a predetermined mechanical breaking point. A particularly durable—and inexpensive-to-manufacture—busbar 1 is therefore achieved according to the invention.

Figure 2A:
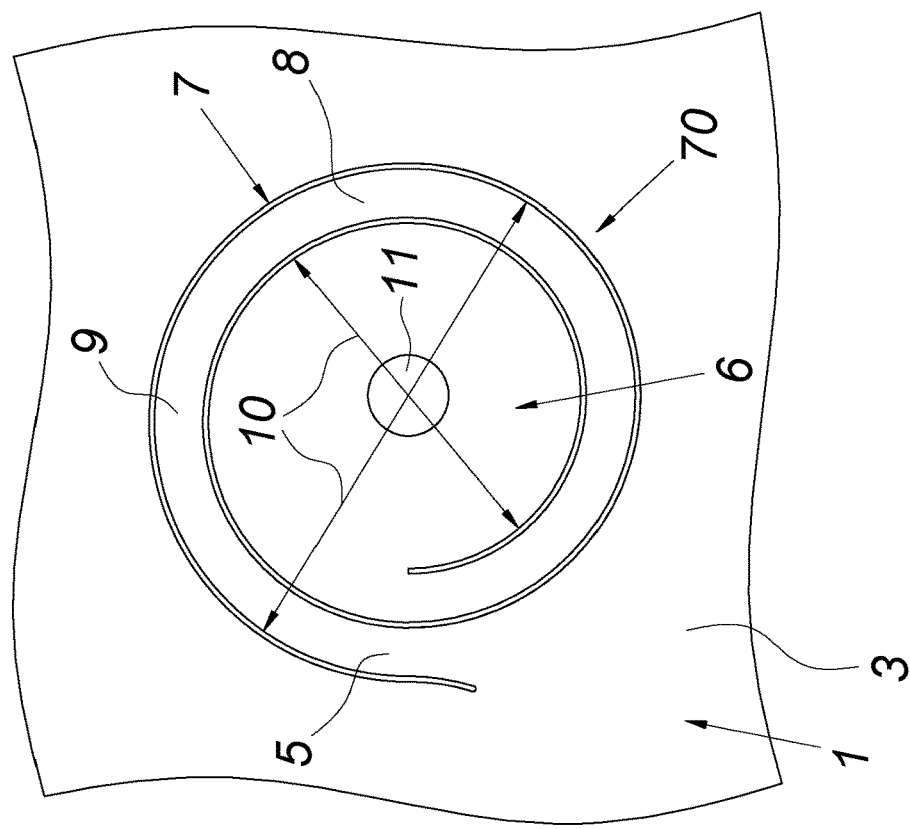

FIGS. 2a and 2b are two detailed views of the busbar 1; FIG. 2a shows a busbar 1 with a safety part 7 that is coiled in a spiral shape and FIG. 2b shows a busbar 1 with a safety part 7 that is coiled in a square shape. At one of its ends, the safety part 7 adjoins the metal sheet 3 and at its other end, it adjoins the contacting part 6 that produces the electrical connection to the pole 4 of the battery cell 2. A safety part that is coiled in an oval shape is also conceivable, but this is not depicted in detail. In general, it is noted that the helical spring can be coiled in an oval, rectangular, triangular, and teardrop-shaped fashion.

The safety part 7 is coiled around the contacting part 6. This is particularly apparent from the top views in FIGS. 2a, 2b, and 3. The safety part 7 is thus embodied in the form of a coiled helical spring 70. The safety part 7 is embodied in the form of a helical spring 70; the helical spring 70 then tapers conically in the axial direction toward the contacting part 6. This particularly promotes the multi-dimensional mobility of the safety part 7—and thus its durability. Such a busbar 1 is shown in FIG. 1. In order to achieve a helical spring shape of this kind, the coil diameter 10 of the safety part 7 or sheet metal strip 9 must decrease in the direction of the contacting part 6 starting from the metal sheet 3 (as shown in FIG. 2). In particular, such springs 70 are embodied in the form of helical tension/compression springs, thus achieving a maximum mobility in both axial directions.

In addition, the safety part 7 is embodied in the form of a sheet metal strip 9, as is apparent from FIGS. 2a and 2b. In particular, this sheet metal strip 9 has a constant width over its entire length in order to be able to embody the fuse 8 in a reproducible way.

All of the sheet metal connector pieces 5 of the metal sheet 3 provided in the busbar 1 are preferably identically embodied for connection to the respective battery cell 2. This is also apparent from the top view in FIG. 3. Through the uniform embodiment of all of the sheet metal connector pieces 5, a safety part 7 with a fuse 8 can be provided for each electrical connection between the poles 4 of the battery cells 2 and the metal sheet 3 of the busbar 1. It is thus possible to provide a safety behavior for all of the battery cells 2 independently of one another, which achieves advantages in terms of safety.

The safety part 7 in this case is embodied in the form of an electrical fuse 8, namely a short-circuit fuse. An electrical fuse 8 could thus be triggered, for example, by an overcurrent to the battery cell 2 or an overcurrent from the battery cell 2 and could thus disconnect the affected battery cell 2 from the busbar 1.

For contacting purposes, the busbar 1 ends in an angled sheet metal tab 20, which forms a contacting surface 21, as shown in FIG. 1.

FIG. 1 also shows a cross-sectional view of a battery module 100 in which several battery cells 2 are electrically connected to a busbar 1. In this case, the electrical connection is produced between the pole 4 of a battery cell 2 and the contacting part 6 of the respective sheet metal connector piece 5 belonging to the battery cell 2. The battery cells 2 in this case are positioned next to one another in the battery module 100 and are positioned with their poles oriented in the same direction, i.e. are electrically connected to one another in parallel. The battery cells 2 can also be held in position by a battery frame 22.

The contacting parts 6 of the respective sheet metal connector pieces 5 are each integrally connected to the associated pole 4 of the battery cell 2 in order to guarantee a low contact resistance and ensure a durable connection. This integral connection is in particular produced by means of a spot weld 11—among other things, because such welds are inexpensive to produce.

According to the invention, it is thus possible for a plurality of battery modules 100 to be combined to form a battery. It is thus possible to set the desired voltage and capacity or power of the battery by connecting the battery modules 100 in a parallel or series circuit.

The invention claimed is:

1. A busbar for connecting battery cells, the busbar comprising:
   an electrically conductive metal sheet;
   at least one sheet metal connector piece, which is incorporated into the metal sheet with the aid of a cutting method and which protrudes from the metal sheet;
   wherein the sheet metal connector piece has a contacting part for electrically connecting to a pole of a battery cell and a safety part which is a coiled helical spring embodied in the form of a fuse.

2. The busbar according to claim 1, wherein the safety part is coiled in a square or spiral shape.

3. The busbar according to claim 1, wherein the safety part is coiled around the contacting part.

4. The busbar according to claim 1, wherein a coil diameter of the safety part decreases in a direction of the contacting part starting from the metal sheet.

5. The busbar according to claim 1, wherein the safety part is a helical tension/compression spring.

6. The busbar according to claim 1, wherein the safety part is a sheet metal strip.

7. The busbar according to claim 1, wherein at one of its ends, the safety part adjoins the metal sheet and at its other end, the safety part adjoins the contacting part.

8. The busbar according to claim 1, wherein the metal sheet contains a nickel material.

9. The busbar according to claim 1, wherein all of the sheet metal connector pieces of the metal sheet are uniformly embodied for connection to a respective battery cell.

10. The busbar according to claim 1, wherein the safety part is a short-circuit fuse.

11. A battery module having a plurality of battery cells and having a busbar according to claim 1, wherein the busbar is connected with each of its sheet metal connector pieces to a respective pole of a battery cell.

12. The battery module according to claim 11, wherein the battery cells positioned next to one another are electrically connected in parallel fashion via the busbar.

13. A battery having several battery modules according to claim 11, which are electrically connected to one another.

* * * * *